May 8, 1923.
S. C. LOWE
MARKING ATTACHMENT FOR STRIP FORMING APPARATUS
Filed Nov. 3, 1921
1,454,058
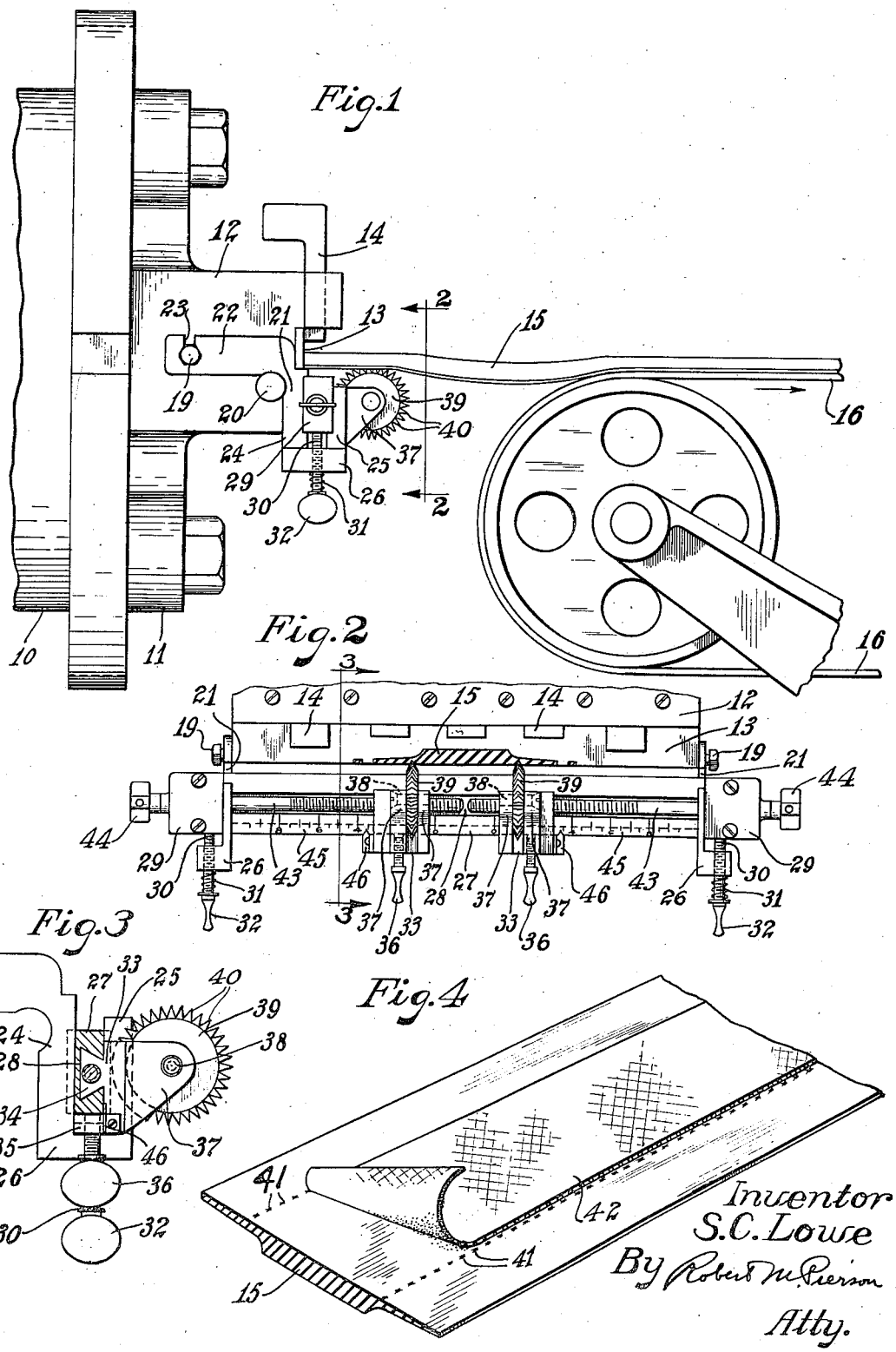

Patented May 8, 1923.

1,454,058

UNITED STATES PATENT OFFICE.

SILAS C. LOWE, OF AKRON, OHIO, ASSIGNOR TO THE B. F. GOODRICH COMPANY, OF NEW YORK, N. Y., A CORPORATION OF NEW YORK.

MARKING ATTACHMENT FOR STRIP-FORMING APPARATUS.

Application filed November 3, 1921. Serial No. 512,682.

*To all whom it may concern:*

Be it known that I, SILAS C. LOWE, a citizen of the United States, residing at Akron, in the county of Summit and State of Ohio, have invented a certain new and useful Marking Attachment for Strip-Forming Apparatus, of which the following is a specification.

This invention relates to apparatus for marking a strip or sheet of plastic material as the latter emerges from a strip-forming or sheet-forming device such as the extruding machines used in the rubber industry and commonly referred to as "tube-machines." One important application of my invention is in the forming of strips of rubber such as are used as treads for pneumatic tires. A relatively narrow strip of rubberized fabric called the "breaker-strip" is usually laid by hand lengthwise upon the tread, in a medial position, thereon, before the latter is incorporated into the tire. It is important that the breaker-strip be accurately placed, and this may best be done by first marking upon the tread the lines on which the edges of the breaker-strip are to lie.

My chief object is to provide improved means for progressively and automatically marking a strip or sheet of material as the latter is formed whereby the position of the markings may be varied at will and accurately controlled. A further object is to provide a marking attachment which readily may be assembled with and removed from a strip-forming means such as a tube machine.

Of the accompanying drawings:

Fig. 1 is a side elevation of an apparatus embodying a preferred form of my invention.

Fig. 2 is a fragmentary section, on the line 2—2 of Fig. 1.

Fig. 3 is a transverse sectional view, on line 3—3 of Fig. 2.

Fig. 4 is a perspective view of the rubber strip reversed, showing a breaker-strip in position thereon.

In these drawings, 10 is the feed cylinder of a tube machine, 11 a cylinder head bolted to the front end of the cylinder and having a forwardly-projecting nozzle 12 and a die plate 13 detachably secured to the front of the latter by quick-detachable wedges 14, and 15 is a strip of rubber formed by forcing a mass of rubber composition from the cylinder through the die plate, the strip being drawn forward and carried away from the tube machine by an endless belt carrier 16. As the strip is carried along by the belt it is cut into lengths which later are taken to make-up tables where the lengths are laid face downward, as shown in Fig. 4, and the breaker-strip 42 is placed along the middle portion of the top side of the rubber strip with its edges parallel to those of the latter, its positioning thereon being facilitated by the presence of parallel rows of indentations 41, which are formed by the device herein described.

On headed stud-bolts 19, 20 (Figs. 1 and 2), projecting from each side of the nozzle 12 is suspended an L-shaped bracket 21, a rearwardly extending arm 22 thereof resting on the bolt 20 and being formed with a recess 23 engaging the bolt 19, the heads of the bolts preventing lateral displacement of the bracket. The other arm of the bracket is U-shaped, being formed by spaced, parallel, vertical members 24, 25 united at their lower ends by a horizontal member 26, which projects laterally outward from the side of each bracket forming an outstanding lug. Sliding vertically in these U-shaped arms below the level of the die plate 13 is a horizontal bar 27 having a dove-tail groove 28 extending along its front face, and blocks 29 at its ends, outside of the brackets 21, the latter preventing a transverse movement of the bar in the brackets. These blocks rest on the upper ends of vertical adjusting screws 30 threaded through holes in the lugs 26, compression springs 31 being provided between winged heads 32 on the bolts and the lower surfaces of the lugs to retain the bolts in adjusted positions.

Tool carrying blocks 33, 33 are slidably mounted on the front of the bar 27 by dovetail projections 34 sliding in the groove 28, each of the blocks having also an ear 35 projecting rearwardly beneath the bar and supporting a vertical wing-headed bolt 36 threaded therethrough which may be set against the lower surface of the bar to hold the block in adjusted position. Projecting from the front of each block is a pair of spaced parallel ears 37, supporting between them on a horizontal pin 38 a star-wheel marker 39, over the teeth 40 of which the rubber strip rides as it leaves the die plate. An adjusting worm 43 with a winged head 44 is rotatably mounted in each of the blocks 29 and threaded through the adjacent tool-carrying block 33, being thus adapted to space apart the marking wheels 39 and position them relatively to the middle of the rubber strip 15.

A double scale 45 reading in opposite directions from the middle portion of the bar 27 is marked on the latter and the blocks 33 are provided with indicating pointers 46 which travel over the scale as the blocks are moved back and forth, to assist the operator in adjusting the wheels transversely of the strip.

When operating the machine the blocks 33 are moved along the bar 27 by turning the adjusting worms 43 until they are approximately in the relative positions desired. The tube machine is then started and the bar is raised by means of the adjusting screws 30 until the weight of the strip forces the lower surface thereof against the sharpened teeth, causing an impression to be made therein by the teeth, and further and more minute adjustment of the blocks 33 on the bar 27 may then be made until the line of impressions made by each star wheel is properly positioned. The depth to which the teeth prick the rubber is regulated by raising and lowering the bar 27 by means of the screws 30. the star wheels requiring to be elevated when the stock is relatively tough or has not sufficient weight to force the lower side of the strip onto the points of the teeth and make a perceptible impression in the rubber. The marking wheels are placed so close to the die plate that the rubber strip does not substantially deviate from a straight course before it is marked by the star wheels, and the pull of the endless belt, drawing the strip forward as fast as it is formed, maintains the alignment of the extruded strip.

When running stock not requiring to be marked the bar 27 may be lowered until the teeth do not engage the strip or the marking device readily may be detached from the tube machine by raising the forward end and sliding the brackets free from the bolts.

I claim:

1. In apparatus of the character described, the combination of means for progressively forming a sheet of plastic material and moving the same forward along a predetermined path, a plurality of means for engaging a surface of the sheet and making parallel impressions thereon while the latter is traversing said path, and means for adjusting said engaging means from and toward each other to vary the lateral spacing of said impressions.

2. In apparatus for making tire-tread stock, the combination of an extruding machine for forming a strip of rubber composition, and means supported in front of and immediately adjacent to the delivery end of said machine in engagement with the lower surface of the strip for making parallel impressions thereon as the strip is formed.

3. In apparatus for making tire-tread stock, the combination of an extruding machine for progressively forming a rubber strip, an endless belt spaced therefrom for progressively carrying the strip away from the machine as the strip is formed, a plurality of means between the machine and belt for progressively marking said strip, and means for adjusting said marking means from and toward each other to vary the lateral spacing of the markings made thereby.

4. In apparatus for making tire-tread stock, the combination of an extruding machine, a die plate on the forward side thereof having a die aperture therein, two laterally spaced vertical impression wheels in front of the aperture in the die plate adapted to be engaged by a strip of rubber composition forced therefrom, and means for adjusting the wheels transversely of the die aperture to vary the relative positions of the impressions made thereby on the rubber strip.

5. In apparatus for making tire-tread stock, the combination of means for progressively forming and feeding forward a strip of rubber composition, a plurality of vertically disposed rotatable wheels positioned closely adjacent the delivery portion of said forming means and adapted to be rotated by contact with the stock, said wheels having circumferential series of sharp teeth engaging the lower surface of the strip and forming parallel rows of impressions therein, and supporting means for the wheels movable vertically to vary the depth of the impressions.

6. In apparatus for making tire-tread stock, the combination of means for progressively forming a strip of rubber composition, a plurality of vertically disposed rotatable wheels adapted to be rotated by contact with the stock, said wheels having circumferential series of sharp teeth engaging the lower surface of the strip and forming parallel rows of impressions therein, supporting means for the wheels movable vertically to vary the depth of the impressions, and means for moving the wheels transversely of the strip to vary the relative positions of the rows of impressions thereon.

7. In apparatus of the character described, the combination of an extruding machine for forming a strip of rubber, and a detachable mechanism for marking a surface thereof, said mechanism comprising brackets adapted to be detachably fastened to the extruding machine, a horizontal bar supported by said brackets across the front of the machine, blocks slidably mounted on said bar, and star-wheels journaled on said blocks in contact with the lower surface of the strip.

8. In apparatus for making rubber strips, the combination of an extruding machine, brackets fastened to the sides of said machine adjacent the outlet thereof and formed with vertical guideways, a horizontal bar extending across the front of the machine below the said outlet and adjustably supported in said guideways, blocks supported by and movable along the bar, means for securing said blocks in adjusted positions, and vertically disposed marker wheels journaled on said blocks and adapted to contact with a strip extruded from said machine.

9. In apparatus of the character described, the combination of an extruding machine, a bar extending horizontally across the delivery end thereof, a block slidably mounted on said bar, means for vertically adjusting said bar, an adjusting worm for positioning said block on said bar, and marking means carried by said block.

In witness whereof I have hereunto set my hand this 31st day of October, 1921.

SILAS C. LOWE.